US006480688B1

(12) United States Patent
Yasui (10) Patent No.: US 6,480,688 B1
(45) Date of Patent: Nov. 12, 2002

(54) IMAGE FORMING APPARATUS AND METHOD USING DIVIDED IMAGE AREAS OF AN ORIGINAL

(75) Inventor: Kazumasa Yasui, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,170

(22) Filed: Aug. 7, 2001

(51) Int. Cl.⁷ .......................... G03G 15/00; G03G 15/36
(52) U.S. Cl. .......................................... 399/194; 399/85
(58) Field of Search .............................. 399/81, 82, 85, 399/86, 194, 204, 383

(56) References Cited

U.S. PATENT DOCUMENTS

| | | | |
|---|---|---|---|
| 4,707,126 A | * 11/1987 | Ohshima et al. | 399/194 X |
| 4,849,789 A | * 7/1989 | Ito et al. | 399/204 X |
| 5,268,717 A | * 12/1993 | Imaizumi | 399/194 X |
| 5,475,475 A | * 12/1995 | Kohtani et al. | 399/86 X |
| 5,732,403 A | * 3/1998 | Nakamura | 399/81 X |
| 5,973,721 A | * 10/1999 | Bergmans et al. | 399/383 X |
| 5,999,767 A | * 12/1999 | Ando | 399/85 |
| 6,188,868 B1 | * 2/2001 | Shiramura | 399/82 X |

FOREIGN PATENT DOCUMENTS

| | | |
|---|---|---|
| JP | 6-311334 | 11/1994 |
| JP | 8-317185 | * 11/1996 |

* cited by examiner

Primary Examiner—Fred L Braun
(74) Attorney, Agent, or Firm—Foley & Lardner (57) ABSTRACT

The present invention relates to an image forming apparatus and an image forming method, in which an image on an original document is read with the image divided into plural areas, a copy image is formed by synthesizing images of the divided areas, and the copy image is printed on a surface of a target image forming medium. The apparatus includes an operation panel which displays plural icons concerning predetermined modes, to allow an icon concerning a desired mode to be selected, a scanner section which reads images of the divided areas of the original document, a hard disk which stores image data read by the scanner section, an image processing section which reads plural image data pieces from the hard disk and performs minification processing and synthesis processing thereon, to obtain one copy image, a printer section which prints the one copy image on a surface of the target image forming medium, and each of the icons indicates an order in which an operator should set the divided plural areas of the original document on an original document mount table.

13 Claims, 11 Drawing Sheets

IMAGE FORMING APPARATUS AND METHOD USING DIVIDED IMAGE AREAS OF AN ORIGINAL

BACKGROUND OF THE INVENTION

The present invention relates to the technical field of OA (Office Automation) apparatuses such as copying machines and the like, and more particularly to an image forming apparatus and a method which picks up an image from each divided area of an original document, processes the image, and outputs to one seat.

In general, in a copying machine or the like, the size of an original document to be set on the glass surface of its original document mount table, i.e., the range which can be scanned at once is limited. Therefore, when an original document having a standard size or more is copied, it is necessary to select a mode such as "2-in-1", "4-in-1", or the like. The "2-in-1" means a mode in which two original documents are minified, printed, and outputted to one sheet. Further, the "4-in-1" means a mode in which four sheets of an original document are minified, printed, and outputted to one sheet.

By using this function to perform copying, a user must set an original document on the glass surface of an original document table, considering the upper and lower sides of the original document. Therefore, in case of printing with use of the function as described above, the user is asked to carry out complicated operation.

Further, in a type of copying machine which is provided with an automatic document feeder (ADF), it is necessary to close the automatic document feeder in order to press the set original document securely to the glass surface. Therefore, original documents having sizes of A1 and A2 are pressed by the automatic document feeder and are thereby bent. In general, since original documents are important for users, there is a demand for avoiding this situation.

Meanwhile, in an apparatus having a scanner which are capable of scanning the entire of a large original document and an automatic document feeder and comprising a function to minify the original documents having sizes A1 and A2, an original document having a large size can be copied at once. However, compared with an apparatus as described above, the apparatus itself is enlarged thereby inviting cost-up. In case of copying an original document having a size of A1, A2, or a larger size, there appears a situation that the boundary is unclear so that overlapping parts increase and data at the overlapping parts is chipped.

In addition, Japanese Patent Application KOKAI Publication No. 6-311334 discloses a technique including a recognition means which recognizes the top and bottom of an original document, a second recognition means which recognizes characters contained in an image, and a means which determines layout of the original document, based on the two recognition means.

BRIEF SUMMARY OF THE INVENTION

The present invention has been made in view of the above problem and has an object of providing an image forming apparatus at a low price, which has a small size and is capable of copying rapidly an original document having a large size such as A1, A2, or the like by a simple operation, without folding the original document even when the automatic document feeder is closed, and an image forming method thereof.

To achieve the above object, according to the present invention, there is provided an image forming apparatus which reads an image on an original document, with the image divided into plural areas, forms a copy image obtained by synthesizing images of the divided areas, and prints the copy image on a surface of a target image forming medium, comprising: setting section which sets a predetermined mode; reading section which reads the images of the divided areas of the original document; storage section which stores image data obtained by the reading means; and image forming section which reads image data from the storage section, performs predetermined image processing thereon, and thereafter forms a copy image on the one surface of the target image forming medium.

Further, according to the present invention, there is provided an image forming apparatus which reads an image on an original document, with the image divided into plural areas, forms a copy image obtained by synthesizing images of the divided areas, and prints the copy image on a surface of a target image forming medium, comprising: an operation panel which displays plural icons concerning predetermined modes, to allow an icon concerning a desired mode to be selected; a scanner section which reads images of the divided areas of the original document; a hard disk which stores image data read by the scanner section; an image processing section which reads plural image data pieces from the hard disk and performs minification processing and synthesis processing thereon, to obtain one copy image; a printer section which prints the one copy image on a surface of the target image forming medium; and each of the icons indicates an order in which an operator should set the divided plural areas of the original document on an original document mount table.

Further, according to the present invention, there is provided an image forming method in which an image on an original document is read with the image divided into plural areas, a copy image is formed by synthesizing images of the divided areas, and the copy image is printed on a surface of a target image forming medium, comprising: a step of setting a predetermined mode; a step of reading the images of the divided areas of the original document; a step of storing image data obtained by the reading means; and a step of reading image data from the storage means, performing predetermined image processing thereon, and thereafter forming a copy image on the one surface of the target image forming medium.

Also, according to the present invention, there is provided an image forming method in which an image on an original document is read with the image divided into plural areas, a copy image is formed by synthesizing images of the divided areas, and the copy image is printed on a surface of a target image forming medium, comprising: a step of displaying plural icons concerning predetermined modes, to allow an icon concerning a desired mode to be selected; a step of reading images of the divided areas of the original document; a step of storing image data read by the scanner section; a step of reading plural stored image data pieces, and of performing minification processing and synthesis processing thereon, to obtain one copy image; and a step of printing the one copy image on a surface of the target image forming medium, wherein each of the icons indicates an order in which an operator should set the divided plural areas of the original document on an original document mount table.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, explanation will be made with reference to the drawings.

Figure 1:
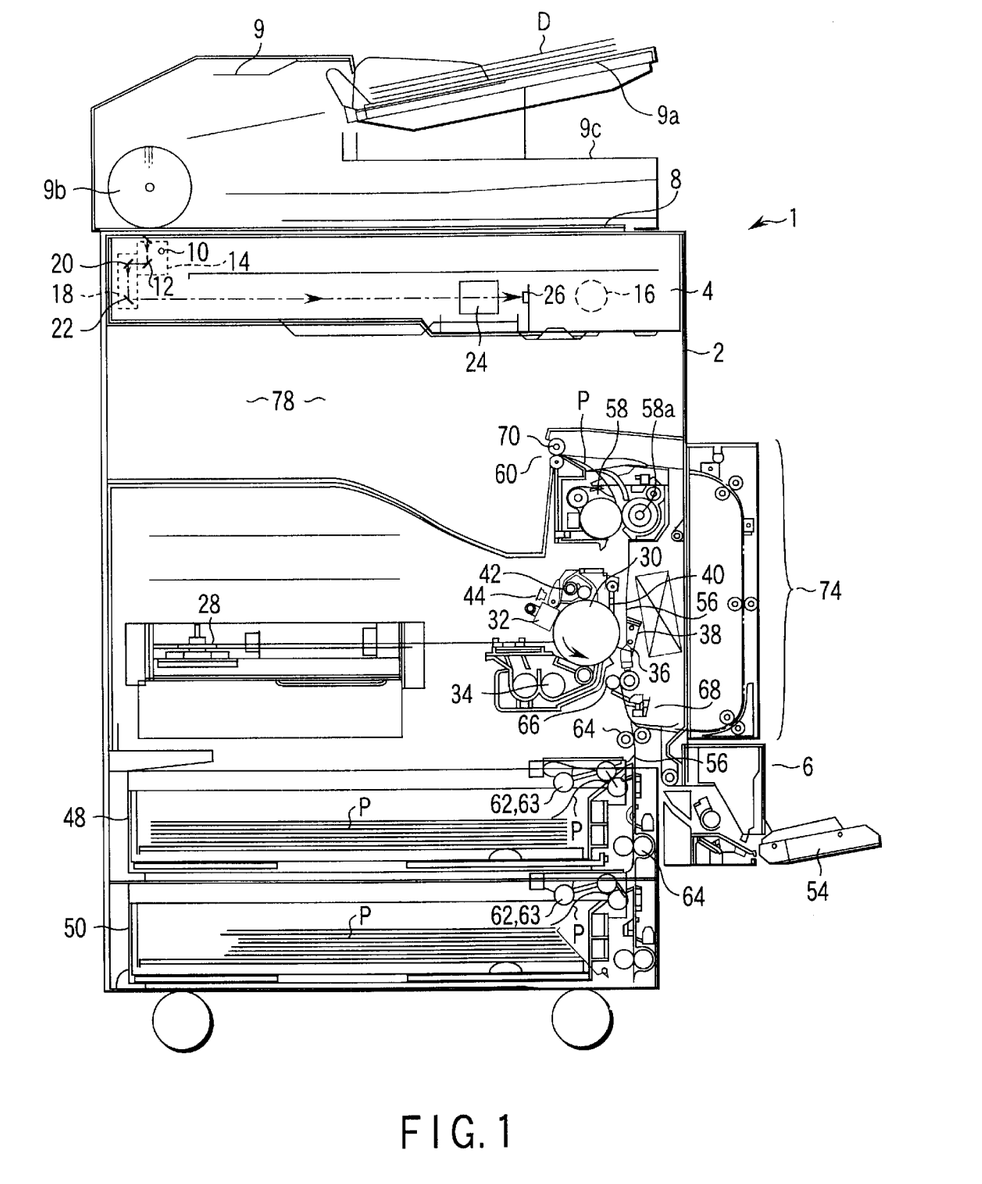
FIG. 1 is a cross-sectional view showing a schematic structure of a digital copying machine as an example of an image forming apparatus according to an embodiment of the present invention.

FIG. 1 is a cross-sectional view showing a schematic structure of a digital copying machine 1 as an example of an image forming apparatus of the present invention.

As shown in FIG. 1, the digital copying machine 1 comprises an apparatus body 2. A scanner section 4 as a read means and a printer section 6 which functions as an image forming means are provided in the apparatus body 2.

An original document mount table 8 is provided on the upper surface of the apparatus body 2. An original document D as a read target is set on the original document mount table 8.

Also, an automatic document feeder 9 (hereinafter called an ADF) which automatically feeds an original document D up to the original document mount table 8 is provided on the upper surface of apparatus body 2. The original document D set on the original document tray 9a of this ADF 9 is conveyed by a convey guide not shown and is discharged onto a sheet discharge tray 9c. In this manner, while the original document D is being conveyed by a platen roller 9b, exposure and scanning are carried out by an exposure lamp 10 of the scanner section 4 described later. Reading of the original document D is thus performed.

An original document is set on the original document tray 9a with the read surface of the original document D oriented upward. If a plurality of original documents are set on the original document tray 9a of the ADF 9, original documents are taken in one after another from the uppermost original document D among documents set thereon.

The scanner section 4 provided in the apparatus body 2 has an exposure lamp 10 and a first mirror 12. The exposure lamp 10 is a light source which illuminates the original document D being conveyed by the ADF 9 or set on the original document mount table 8. For example, the exposure lamp 10 comprises a halogen lamp or the like. The first mirror 12 deflects reflection light from the original document in a predetermined direction. This exposure lamp 10 and the first mirror 12 are attached to a first carriage 14 provided below the original document mount table 8.

The first carriage 14 is provided to be movable in parallel with the original document mount table 8. This first carriage 14 is reciprocated below the original document mount table 8 by a scanner motor (drive motor) 16 through a toothed belt or the like not shown. This scanner motor 16 comprises a stepping motor or the like.

In addition, a second carriage which is movable in parallel with the original document mount table 8. The second carriage 18 is attached with second and third mirrors 20 and 22 to be perpendicular to each other.

The second and third mirrors 20 and 22 serve to orderly deflect the reflection light deflected from the first mirror 12.

Torque from the scanner motor 16 is transmitted to the second carriage 18 through the toothed belt or the like which drives the first carriage 14. In this manner, the second carriage 18 is moved as a slave to the first carriage 14.

That is, the second carriage 18 is moved along the original document mount table 8 at ½ a speed of the first carriage 14.

Also, below the original document mount table 8, there are provided an image forming lens 24 and a CCD sensor 26. This image forming lens 24 is provided in the plane including the optical axis of light deflected by the third mirror 22, to be movable through a drive mechanism.

This image forming lens 24 itself moves to form an image of reflection light from the third mirror 20 on the second carriage 18 at a desired magnification (main scanning direction).

The CCD sensor 26 receives reflection light converged by the image forming lens 24, in accordance with an image processing clock supplied from a main CPU described later, and photoelectrically converts the reflection light. In this manner, an electric signal corresponding to a scanned original document D is outputted.

The magnification in the sub-scanning direction can be dealt with by changing the convey speed based on the ADF 9 or the moving speed of the first carriage 14.

To read an original document D being conveyed by the ADF 9, the illumination position based on the exposure lamp 10 is fixed to a position shown in FIG. 1. In addition, to read the original document D set on the original document mount table 8, the illumination position based on the exposure lamp 10 is moved from the left to the right along the original document mount table 8.

Meanwhile, the printer section 6 comprises a laser exposure device 28. The circumferential surface of the photosensitive drum 30 is scanned by the laser light from this laser exposure device 28, thereby to form an electrostatic latent image on the circumferential surface of the drum 30. In addition, the printer section 6 has a photosensitive drum 30. This photo-sensitive drum 30 is provided substantially in the center right side of the apparatus body 2, and functions as an image carrier to be rotatable freely.

The circumferential surface of the photosensitive drum 30 having this structure is exposed with laser light from the laser exposure device 28, thereby to form a desired electrostatic latent image. On the circumferential surface of this photosensitive drum 30, there are provided a charger 32, a developing device 34, a transfer charger 38, a peeling nail 40, a cleaner 42, and a discharger 44.

The charger 32 serves to charge the circumferential surface of the photosensitive drum 30 with predetermined charges. The developing device 34 supplies toner as a developing agent to the electro-static latent image formed on the circumferential surface of the photosensitive drum 30, thereby to develop it at a desired image concentration.

Further, the transfer charger 38 integrally includes a peeling charger 36 which separates each copy paper sheet P as a image formation target medium supplied from cassettes 48 and 50 which will be described later. This transfer charger 38 serves to transfer a toner image formed on the photosensitive drum 30 to a paper sheet P. The peeling nail 40 serves to peel the copy paper sheet P from the circumferential surface of the photosensitive drum 30. The cleaner 42 cleans toner remaining on the circumferential surface of the photosensitive drum 30. Further, discharger 44 discharges the circumferential surface of the photosensitive drum 30.

At a lower part in the apparatus body 2, an upper cassette 48 and a lower cassette 50 are provided and layered, such that each cassette can be drawn off from the apparatus body. In the cassettes 48 and 50, copy paper sheets P of different sizes are filled respectively. In the side of the upper cassette 48, there is provided a manual insertion tray 54.

In this apparatus body 2, a convey route 56 is formed to extend through a transfer part positioned between a photosensitive drum 30 and a transfer charger 56 from each of the cassettes 48 and 50. A fixing device 58 having a fixing lamp 58a is provided at an end of the convey route 56. At an upper part of the fixing device 58, a discharge port 60 is formed.

Near each of the upper cassette 48 and the lower cassette 50, a sheet feed roller 62 and a separation roller 63 are provided to pick out paper sheets P one after another from the cassettes 48 and 50. The convey route 56 is provided with paired sheet feed rollers 64. There are a plurality of pairs of sheet feed rollers 64, which convey copy paper sheets P picked up by the sheet feed roller 62 and the separation roller 63, through the convey route 56.

On the convey route 56, paired resist rollers 66 are provided in the upstream side of the photosensitive drum 30. These paired resist rollers 66 correct the inclination of each picked-up copy paper sheet P. Accordingly, the paired resist rollers 66 align the top end of the toner image on the photosensitive drum 30 with the top end of the copy paper sheet P, and supply the copy paper sheet P to the transfer part at the same speed as the moving speed of the circumferential surface of the photosensitive drum 30. An aligning pre-sensor 68 is provided at a position before the paired resist rollers 66, i.e., in the side of the sheet feed roller 64.

Copy paper sheets picked-up one after another from the cassettes 48 and 50 are fed to the paired resist rollers 66 by the paired sheet feed rollers 64. Further, the top end of each copy paper sheet P is aligned by the paired resist rollers 66 and is thereafter sent to the transfer part. A developer image formed on the photosensitive drum 30, i.e., a toner image is transferred to the paper sheet P by the transfer charger 38.

The copy paper sheet P to which the toner image has been transferred is peeled off from the circumferential surface of the photosensitive drum 30, by the operation of a peeling charger 36 and a peeling nail 40. Further, the copy paper sheets P are conveyed to the fixing device 58 by a convey belt not shown, which form part of the convey route 56. Further, a developer image is melted and fixed to the copy paper sheet P. Thereafter, the copy paper sheet P is discharged onto the discharge tray 72 in the apparatus body 2 through a discharge port 60 by paired sheet discharge rollers 70.

In the right side of the convey route 52, there is provided an automatic double-side device 74 for reversing a copy paper P which has passed through a fixing device 58 and feeding it again to the convey route 56. At an upper part of the front surface of the apparatus body 2, there is provided an operation panel for instructing various copy conditions such as copy magnification, start of copying, and the like.

Figure 2:
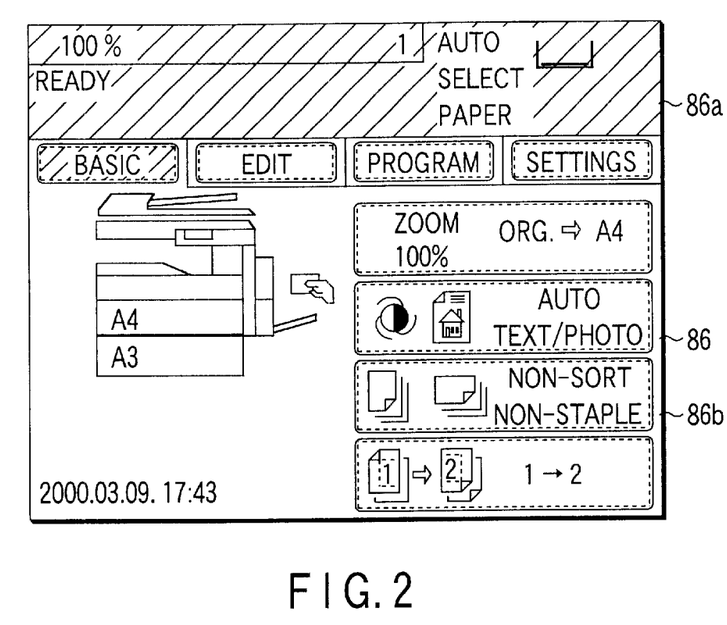
FIG. 2 is a view showing a state of a liquid crystal display section 86 of a digital copying machine 1.

This operation panel is provided with a liquid crystal display section (LCD) 86 including touch-keys by which an operation guide is supplied and various instructions can be made, as shown in FIG. 2.

As shown in FIG. 2, the liquid crystal display section 86 comprises an operation guide display section 86a where operation guides such as "READY" and the like are displayed, and a setting display section 86b where various setting contents are switched and displayed. In this case, the setting display section 86b has, for example, setting screens for basic functions (BASIC) as an initial screen, applications (EDIT), programs (PROGRAM), and setting (SETTINGS). For example, on the setting screen for programs and setting, setting of priorities, cancel of jobs, list display of jobs, change and addition to priority settings, and the like.

Figure 3:
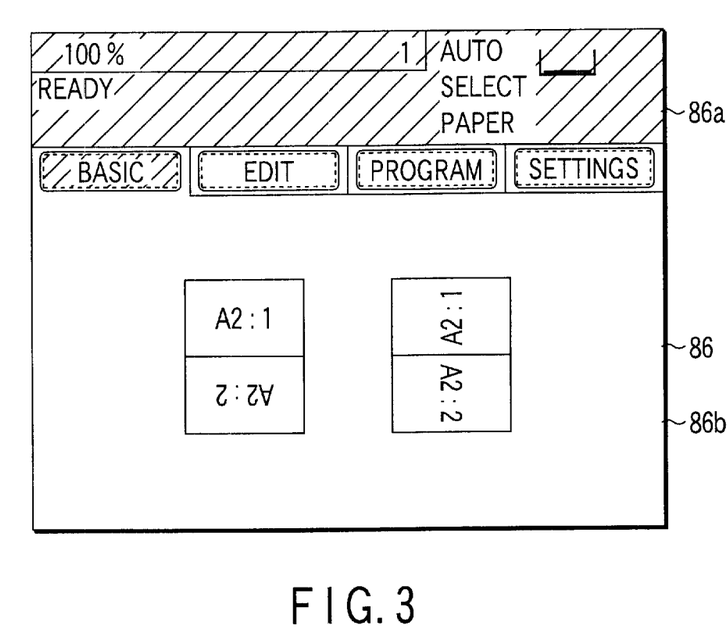
FIG. 3 is a view showing a state in which icons to be selected when setting a 2-in-1 mode are displayed on the liquid crystal display section 86 of the digital copying machine 1.

If the setting of "2-in-1" mode is pressed in the initial screen shown in FIG. 2, the setting screen as shown in FIG. 3 is displayed.

The digital copying machine 1 may be of a type which can be used alone or used as a network printer. In the latter case, the digital copying machine 1 is structured such that it is connected to a personal computer (PC) not shown or a server not shown through a local network (LAN).

Figure 4A:
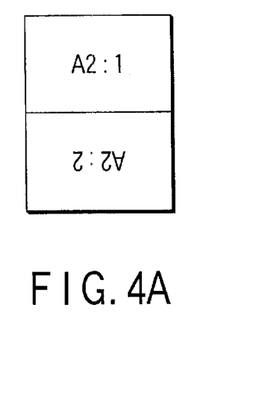
FIG. 4A shows a first icon to be selected at the time of the 2-in-1 mode.
Figure 4B:
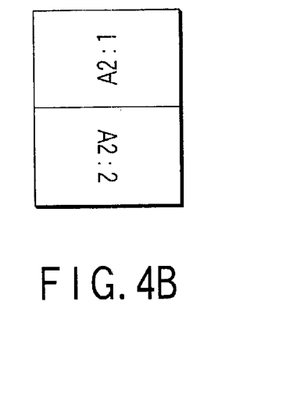
FIG. 4B shows a second icon to be selected at the time of the 2-in-1 mode.

On the setting screen shown in FIG. 3, icons as shown in FIGS. 4A and 4B (FIGS. 5A to 5D in the 4-in-1 mode) are displayed.

FIG. 4A shows an icon which indicates execution of processing of printing and outputting an original document of A2 size to a sheet of a predetermined size such as A3 or so, in the 2-in-1 mode. Similarly, FIG. 4B shows an icon which indicates execution of processing of printing and outputting an original document of A2 size to a sheet of a predetermined size such as A3 or so, in the 2-in-1 mode.

Meanwhile, FIGS. 5A to 5D show an icon which indicates execution of processing of printing and outputting an original document of A1 size to a sheet of a predetermined size such as A3 or so, in the 2-in-1 mode.

Figure 5A:
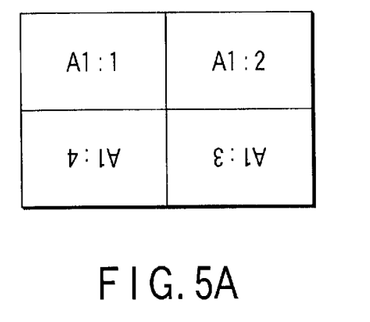
FIG. 5A shows a third icon to be selected at the time of the 4-in-1 mode.
Figure 5B:
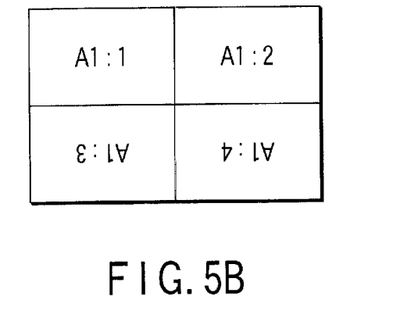
FIG. 5B shows a fourth icon to be selected at the time of the 4-in-1 mode.

That is, if the icon shown in FIG. 5A is selected, ¼ areas at upper left, upper right, lower left, and lower right of the original document of A1 size are sequentially set on the original document mount table and are scanned. Otherwise, if the icon shown in FIG. 5B is selected, ¼ areas at upper left, upper right, lower right, and lower left of the original document of A1 size are sequentially set on the original document mount table and are scanned. Print output based on the above processing is obtained in the form of A3 lateral.

Figure 5C:
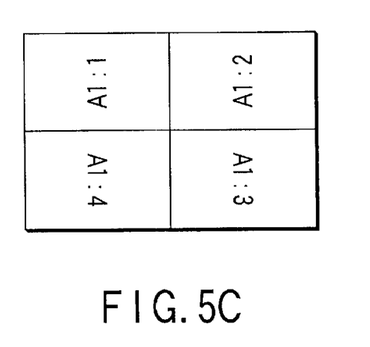
FIG. 5C shows a fifth icon to be selected at the time,of the 4-in-1 mode.
Figure 5D:
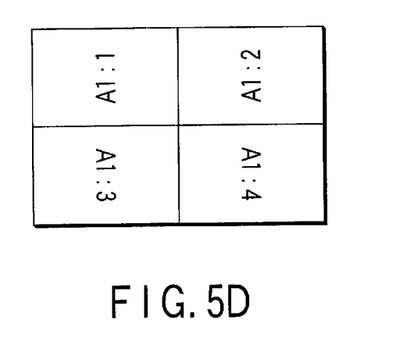
FIG. 5D shows a sixth icon to be selected at the time of the 4-in-1 mode.

Further, if the icon shown in FIG. 5C is selected, ¼ areas at upper left, upper right, lower right, and lower left of the original document of A1 size are sequentially set on the original document mount table and are scanned. Otherwise, if the icon shown in FIG. 5D is selected, ¼ areas at upper left, upper right, lower right, and lower left of the original document of A1 size are sequentially set on the original document mount table and are scanned. Print output based on the above processing is obtained in form of A3 longitudinal.

Figure 6:
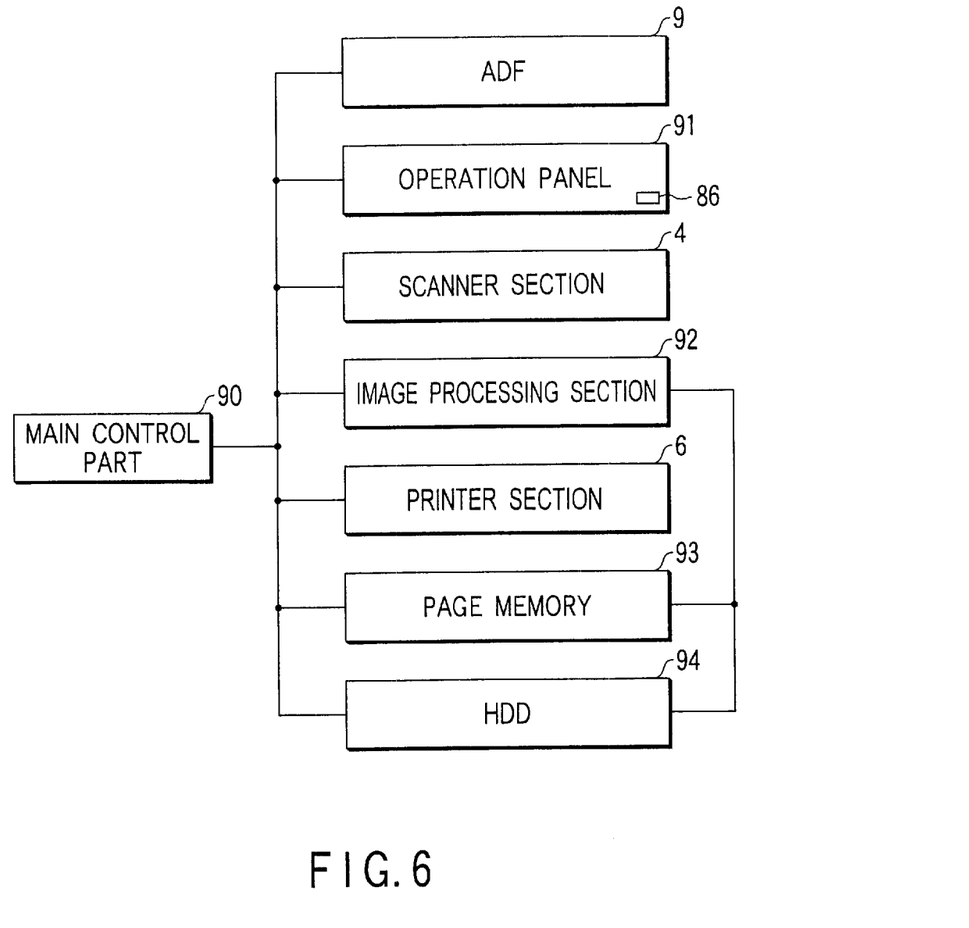
FIG. 6 is a view specifically showing the internal structure of a control circuit of the digital copying machine as an example of the embodiment of the present invention.

Next, the internal structure of a control circuit of a digital copying machine 1 as an example of an image forming apparatus according to an embodiment of the present invention will be explained specifically with reference to FIG. 6.

This digital copying machine 1 has a main control section 90. More specifically, this main control section 90 comprises a CPU (Central Processing Unit) not shown, a ROM (Read Only Memory), and a RAM (Random Access Memory). The CPU controls their operations. The ROM stores software for the operation of the digital copying machine 1. The RAM temporarily stores image data and other operation data.

The main control section 90 is connected to an ADF 9, a scanner section 4, a printer section 6, an operation panel 91, an image processing section 92, a page memory 93, and a HDD 94, through a bus 95. Also, the main control section 90 is connected to an image processing section 92, a page memory 93, and a HDD 94, through an image bus 96.

The image processing section 92 processes an original document image read by the scanner section 4, processes image data from the HDD 94, or outputs processed image data to the page memory 93, the printer section 6, and the HDD 94.

Further, the image processing section 92 has a compression/expansion circuit not shown. The image processing section 92 uses this compression/expansion circuit to compress image data from the page memory 93 or expand image data from the HDD 94. The page memory 93 registers image data from the image processing section 92. The HDD 94 is an external storage device represented by a hard disk which stores various data. For example, when a plurality of sets of copies are taken, an image obtained by compressing read images of plural sheets of original document images are registered in the HDD 94. In printing, these compressed images are read and printed. The main control section 90 has an input task and a print task, managed for every job.

The present invention determines a boundary between images by detecting overlapping between image data and has a function to process data so as to eliminate the overlapping. A function to change the area to be corrected at this time is also included. Thus, shortening of determination time and correct determination can be achieved by determining only a specific area.

By the structure and function explained above, the following characteristic processing is realized by the image forming apparatus and the method according to the present invention.

That is, in the 2-in-1 mode, an original document of A2 size is divided by two. In the 4-in-1 mode, an original document of A1 size is divided by four. Then, image data pieces of divided areas are read, minified, and processed to generate image data, which is synthesized, transferred, and outputted to one sheet.

In the following, a series of processing for dividing an original document of A2 size by two, and scanning, printing, and outputting it to one sheet of A3 size in the 2-in-1 mode.

At first, to more clarify the characteristic of the present embodiment, explanation will now be made of a processing flow during general 2-in-1 mode. In this case, the copy mode is set to one surface of an original document in the 2-in-1 mode, the paper sheet size is set to A3, and the minification size is set to 71%.

Figure 7A:
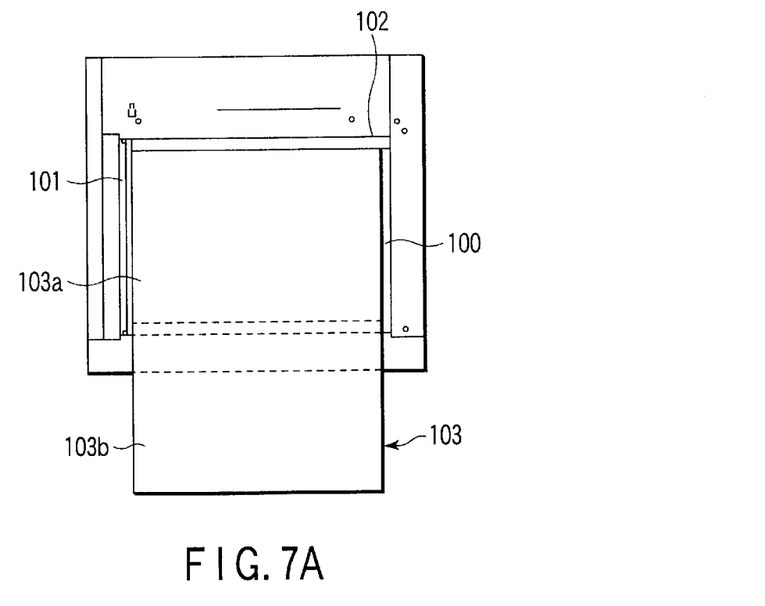
FIG. 7A is a view showing a state in which a ½ area 103a of an original document 103 is scanned by a general method.

Further, as shown in FIG. 7A, a ½ area 103a of an original document 103 of A2 size is set on an original document mount table 100 such that its depth side contacts an original document contact sheet 102 and its left side contacts an indicator 101. Further, the image of a ½ area 103a of the original document 103 is read.

Figure 7B:
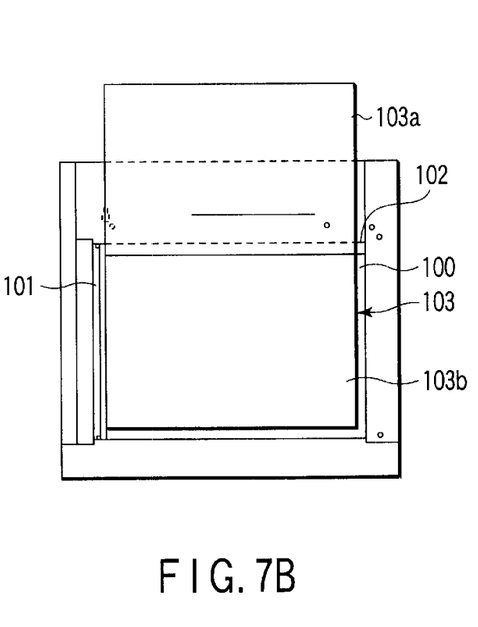
FIG. 7B is a view showing a state in which a ½ area 103b of the original document 103 is scanned by the general method.

Subsequently, as shown in FIG. 7B, the ½ area 103b of the original document 103 of A2 size is set on the original document mount table 100. Further, the original document 103 is set such that its left side contacts the side of an indicator 101 and that the edge of the original document 103 matches with an index of A4/A3 of the indicator. Further, another ½ area 103b of the original document 103 is read.

Figure 7C:
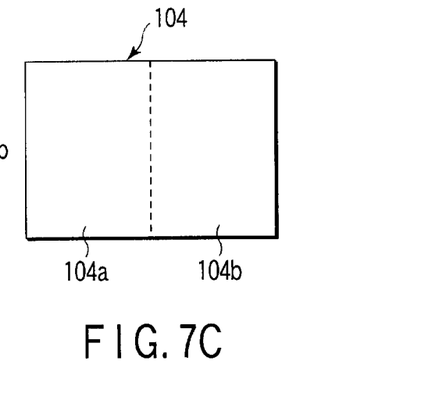
FIG. 7C is a view showing a state in which a ½ area of the original document 103 is scanned by the general method.

The print output based on the processing described above is shown in FIG. 7C. The ½ area 103a of the original document 103 is minified and printed on the area 104a of the printed sheet 104, and the image of the ½ area 103b of the original document 103 is minified and printed on the area 104b. In the above processing, the ADF cannot be closed in many cases. If it is closed, the original document is folded in half and creased.

In contrast, in the processing when the 2-in-1 mode is selected according to the present embodiment, all settings are automatically carried out by selecting icons displayed on the operation panel 91 (see FIG. 4A or 4B). Following this selection, the operator needs only to set the ½ areas of an original document sequentially on an original document mount table 200, in accordance with a procedure indicated by a selected icon (FIG. 4A or 4B).

In the following, processing when the 2-in-1 mode is selected according to the present embodiment will be explained, appropriately referring to FIGS. 8A to 8C and the flowchart in FIG. 9.

That is, an icon (FIG. 4A or 4B) is selected (step S1).

Figure 8A:
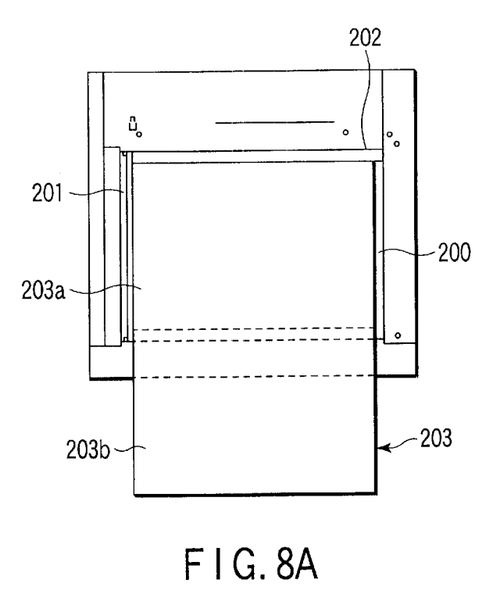
FIG. 8A is a view showing a state in which a ½ area 203a of an original document 203 is scanned by a general method.
Figure 9:
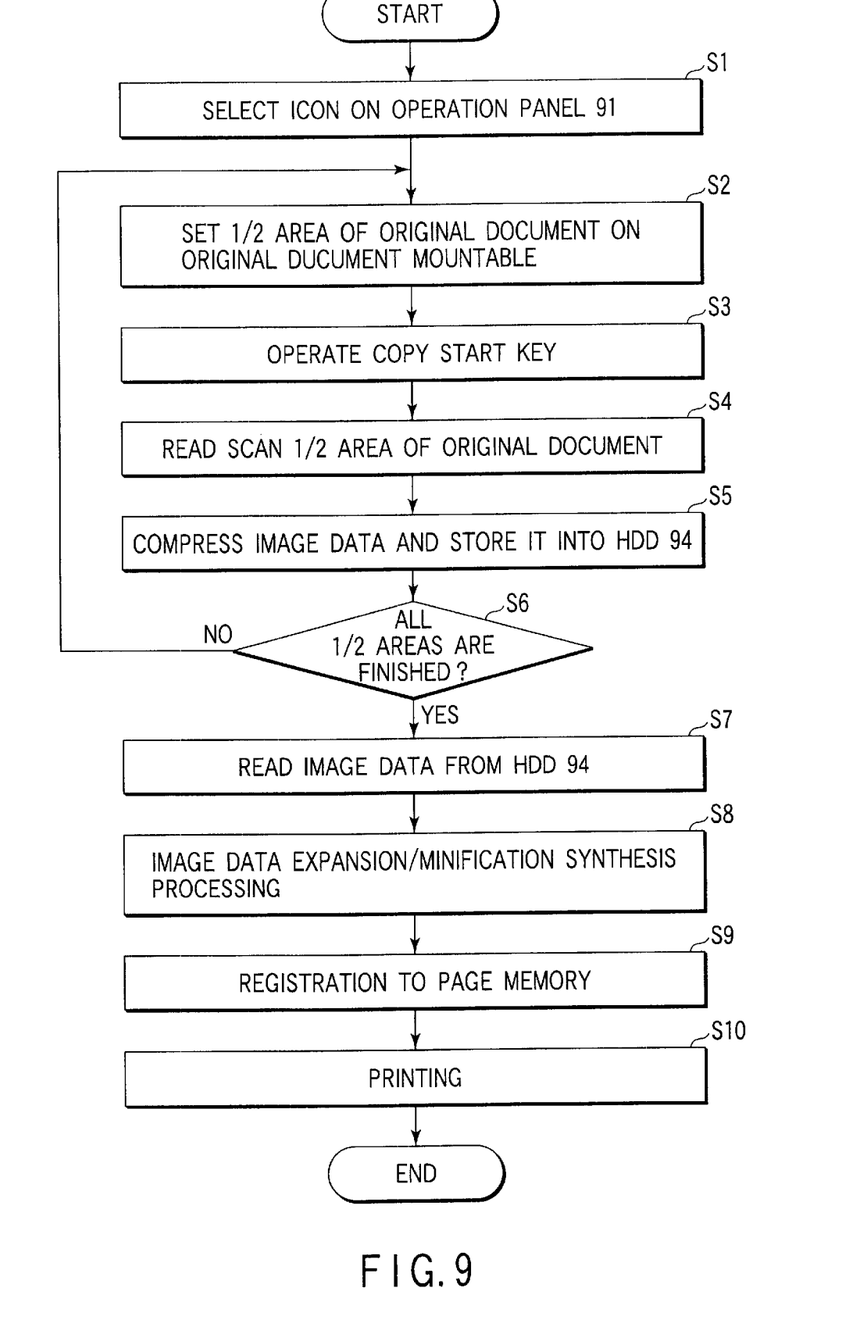
FIG. 9 is a flowchart concerning processing when the 2-in-1 mode the digital is selected by the digital copying machine 1 as an example of an image forming apparatus according to the embodiment of the present invention.

Thereafter, as shown in FIG. 8A, a ½ area 203a of an original document 203 of A2 size is set on an original document mount table 200 such that its upper side contacts an original document contact sheet 202 and its left side contacts an indicator 201. Further, the copy start key is operated. Then, under control by the main control section 90, the image of the ½ area 203a is scanned by the scanner section 4. Image data obtained by the scanner section 4 is compressed by the image processing section 92 and is thereafter stored into the HDD 94 (steps S2 to S6 in the first cycle).

Figure 8B:
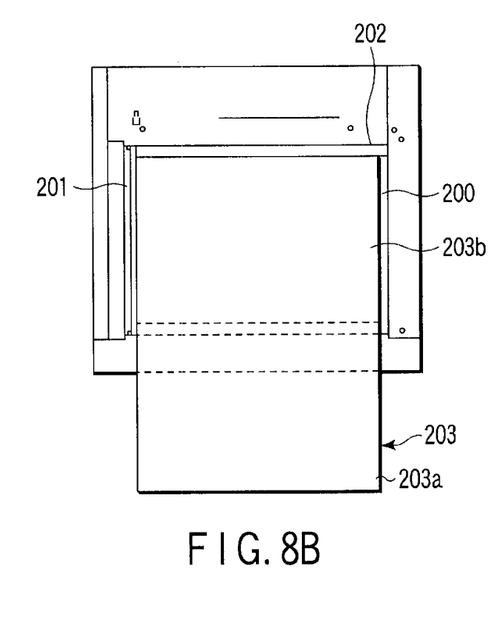
FIG. 8B is a view showing a state in which a ½ area 203b of the original document 203 is scanned by the general method.

Next, as shown in FIG. 8B, the operator rotates the original document 203 of A2 size manually by 180 degrees and thereafter sets it such that the left side of another ½ area 203b contacts the side of the indicator 201 and such that the upper side thereof contacts the original document contact sheet 202. At the time of this operation, the ADF can be closed and the original document is not folded. When the copy start key is further operated, the image of the ½ area 203b is scanned under control by the main control section 90. The image data obtained by this scanner section 4 is compressed by the image processing section 92 and is thereafter stored into the HDD 94 (steps S2 to S6 in the second cycle).

Thus, the image data stored in the HDD 94 is read out by the main control section 90 (step S7). Further, expansion processing is carried out by the image processing section 92, and thereafter, minification processing and synthesize processing are carried out (step S8). Thereafter, the image data is developed over the page memory 93 (step S9). This image data is sent to the printer section 6, and predetermined print output is carried out at the printer section 6 (step S10).

Figure 8C:
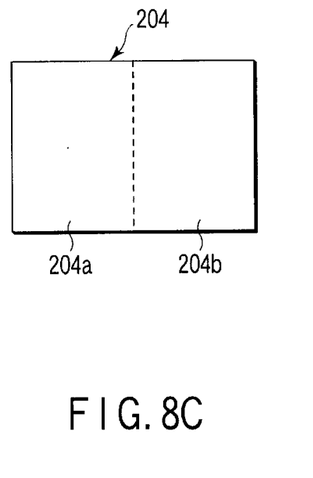
FIG. 8C is a view showing an example of print output.

This print output is shown in FIG. 8C. In the area 204a of the printed sheet 204, the image of the ½ area 203a of the original document 203 is minified and printed. In the area 204b of the sheet 204, the image of the ½ area 203b of the original document 203 is minified and printed on the area 204b.

In the general method (FIGS. 7A to 7C) described above, there appears a situation that the areas 104a and 104b overlap indefinitely on each other and one same area is copied twice.

In contrast, in the method (FIGS. 8A to 8C) according to the present embodiment, this situation can be avoided. In addition, the output at the boundary between the areas 204a and 204b is stabilized so that overlapping does not substantially occur. Accordingly, beautiful copies can be taken.

Next, explanation will be made of a series of processing when the original document of A1 size is divided and scanned by the 4-in-1 function.

At first, to clarify more the characteristic of the present embodiment, explanation will firstly be made of the processing flow in a general 4-in-1 mode. In this case, the copy mode is set to one surface of the original document in the mode of 4-in-1. The paper sheet size is set to A3, and the magnification size is set to 71%.

Figure 10A:
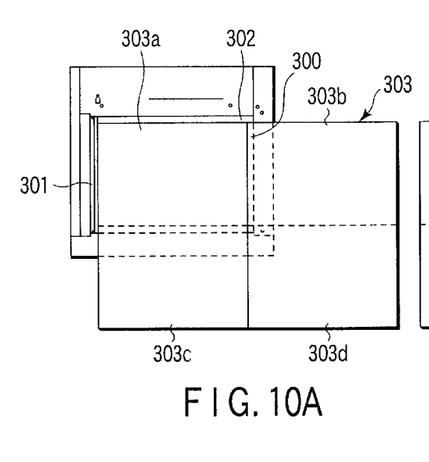
FIG. 10A is a view showing a state in which a ¼ area 303a of an original document 303 is scanned by a general method.

Further, as shown in FIG. 10A, an original document of A1 size is set on the original document mount table 100 such that the upper left side of a ¼ area 303a of the original document contacts an original document contact sheet 302 and such that the left side contacts an indicator 301. Further, the image of the ¼ area 303a of the original document 303 is read.

Figure 10B:
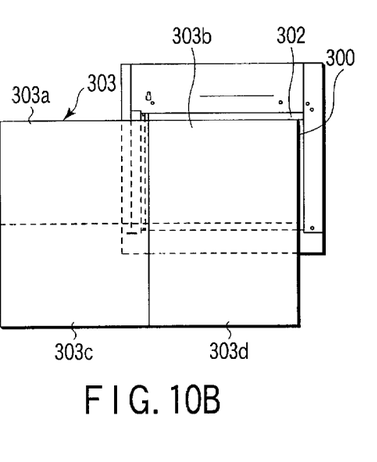
FIG. 10B is a view showing a state in which a ¼ area 303b of the original document 303 is scanned by the general method.

Next, as shown in FIG. 10B, the original document 303 of A1 size is set such that the upper right side of the ¼ area 303b thereof contacts the original document contact sheet 302 and such that the right side thereof contacts a corner of a glass surface. Further, the image of the ¼ area 303b of the original document 303 is read.

Figure 10C:
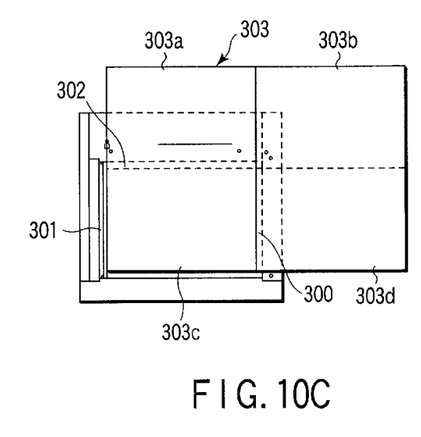
FIG. 10C is a view showing a state in which a ¼ area 303c of the original document 303 is scanned by the general method.

Further, as shown in FIG. 10C, an original document 303 of A1 size is set such that the left side of a ¼ area 303c thereof contacts the side of the indicator 301 and such that its lower side is aligned with an index indicating the size A4/A3. Then, the image of the ¼ area 303c of the original document 303 is read.

Figure 10D:
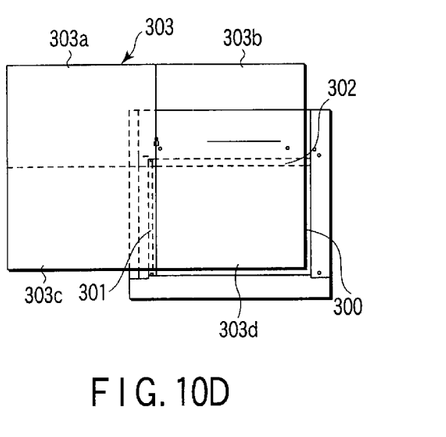
FIG. 10D is a view showing a state in which a ¼ area 303d of the original document 303 is scanned by a general method.

Further, as shown in FIG. 10D, the original document 303 of A1 size is set such that the right side of a ¼ area 303d contacts the right edge of the glass surface and such that its lower side is aligned with an index indicating the size A4/A3. Further, the image of the ¼ area 303d is read.

Figure 10E:
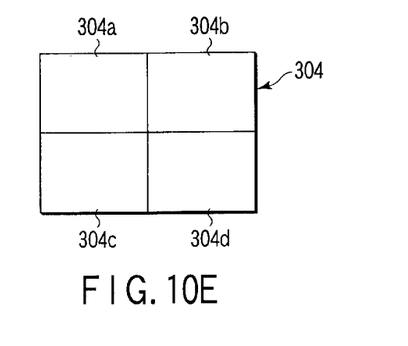
FIG. 10E is a view showing an example of print output.

The print output based on the above processing is shown in FIG. 10E. The images of the areas 303a, 303b, 303c, and 303d are minified and printed on the areas 304a, 304b, 304c, and 304d of the printed sheet 304. In the above processing, however, the ADF cannot be closed in many cases. If it is closed, the original document of A2 is folded in half and creased.

In contrast, in the processing when the 4-in-1 mode is selected according to the present embodiment, all settings are automatically carried out by selecting icons (see FIGS. 5A to 5D).

Thereafter, the operator needs only to set the ¼ areas of an original document sequentially on an original document mount table 400, in accordance with a procedure indicated by the icons selected by the operator (FIGS. 5A to 5D).

In the following, processing when the 4-in-1 mode is selected according to the present embodiment will be explained, appropriately referring to FIGS. 11A to 11E and the flowchart in FIG. 12.

That is, the operator selects an icon (FIGS. 5B or 5D) displayed on the operation panel 91 (step S11).

Figure 11A:
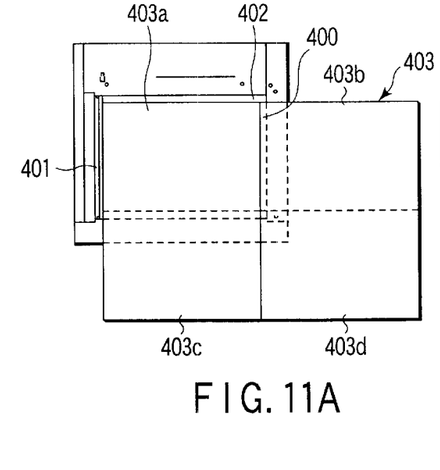
FIG. 11A is a view showing a state in which a ¼ area 403a of an original document 403 is scanned by a method according to the present invention.
Figure 12:
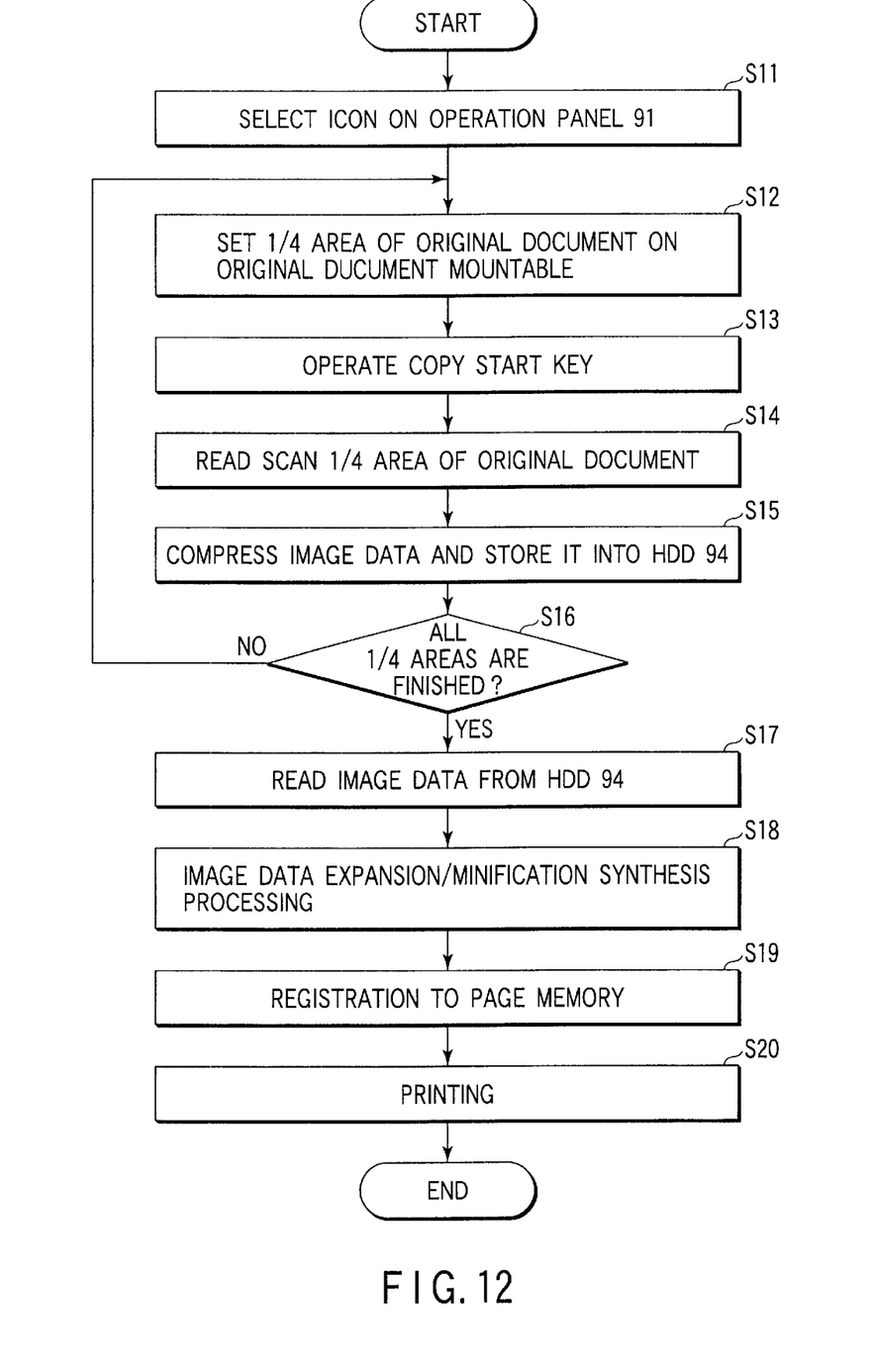
FIG. 12 is a flowchart concerning processing when the 4-in-1 mode the digital is selected by the digital copying machine 1 as an example of an image forming apparatus according to the embodiment of the present invention.

Thereafter, as shown in FIG. 11A, the operator sets a ¼ area 403a of an original document 403 of A1 size on the original document mount table 400 such that its deep side contacts an original document contact sheet 402 and its left side contacts an indicator 401. Further, the copy start key is operated. Then, under control by the main control section 90, the image of the ¼ area 403a of the original document 403 is scanned by the scanner section 4. Image data obtained by the scanner section 4 is compressed by the image processing section 92 and is thereafter stored into the HDD 94 (steps S12 to S16 in the first cycle).

Figure 11B:
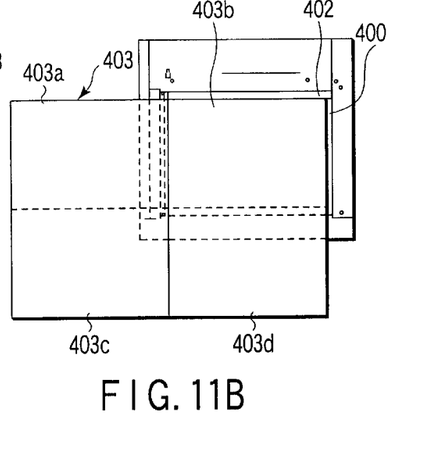
FIG. 11B is a view showing a state in which a ¼ area 403b of the original document 403 is scanned by the method according to the present invention.

Next, as shown in FIG. 11B, the operator sets a ¼ area 403b of the original document 403 of A1 size such that its deep side contacts the original document contact sheet 402 and its right side contacts a corner of the glass surface. Further, the copy start key is operated. Then, under control by the main control section 90, the image of the ¼ area 403b of the original document 403 is scanned by the scanner section 4. Image data obtained by the scanner section 4 is compressed by the image processing section 92 and is thereafter stored into the HDD 94 (steps S12 to S16 in the second cycle).

Figure 11C:
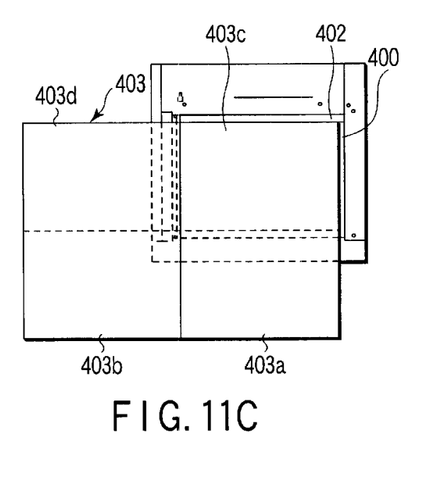
FIG. 11C is a view showing a state in which a ¼ area 403c of the original document 403 is scanned by the method according to the present invention.

Further, as shown in FIG. 11C, the operator manually rotates the original document 403 of A1 size and sets it such that the left side of a ¼ area 403c of the original document contacts the side of the indicator 401 and its deep side contacts the original document contact sheet 402, like the case of the first surface. At this time, the ADF can be closed and the original document is not folded. Further, the copy start key is operated. Then, under control by the main control section 90, the image of the ¼ area 403c is scanned by the scanner section 4. Image data obtained by the scanner section 4 is compressed by the image processing section 92 and is thereafter stored into the HDD 94 (steps S12 to S16 in the third cycle).

Figure 11D:
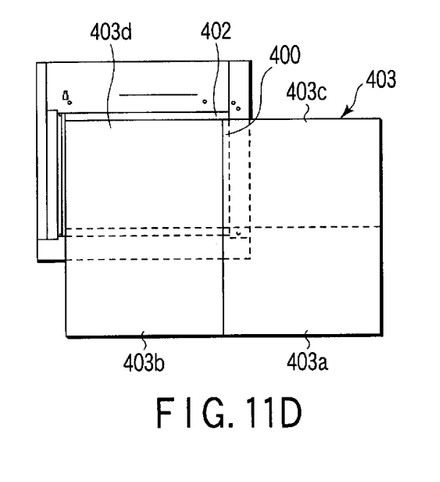
FIG. 11D is a view showing a state in which a ¼ area 403d of the original document 403 is scanned by the method according to the present invention.

Next, as shown in FIG. 11D, the original document 403 of A1 size is slid and set such that the left side of a ¼ area 403d of the original document contacts the side of the indicator 401 and its right side edge contacts a corner of the glass surface, like the case of the second surface. Further, the copy start key is operated. Then, under control by the main control section 90, the image of the ¼ area 403d is scanned by the scanner section 4. Image data obtained by the scanner section 4 is compressed by the image processing section 92 and is thereafter stored into the HDD 94 (steps S12 to S16 in the fourth cycle).

Thus, the image data stored into the HDD 94 is read out by the main control section 90 (step S17). Further, it is subjected to expansion processing by the image processing section 92 and thereafter to minification processing and synthesis processing (step S18). Thereafter, the image data is developed on the page memory 93 (step S19). Further, the image data developed on the page memory 93 is sent to the printer section 9 by which predetermined printing is carried out (step S20).

Figure 11E:
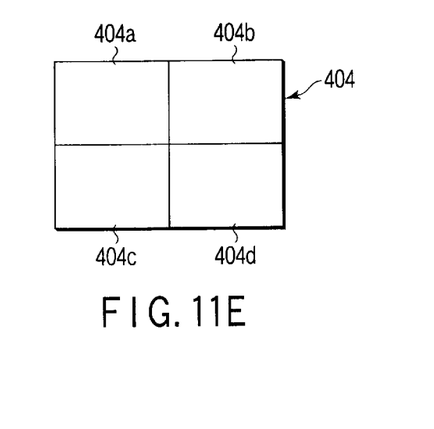
FIG. 11E is a view showing an example of print output.

This print output is shown in FIG. 11E. The images of the areas 403a, 403b, 403c, and 403d are minified and printed on the areas 404a, 404b, 404c, and 404d of the printed sheet 404.

As described previously, in the general method (FIGS. 10A to 10D), there appears a situation that positions of a plurality of surfaces are indefinite in the forward-backward direction and overlap on each other and one same area is copied twice.

In contrast, in the method (FIGS. 11A to 11D) according to the present embodiment, this situation can be avoided. In addition, the output at the boundaries between the areas 204a and 204b and between the areas 204c and 204d is stabled. Further, beautiful A3 copies can be taken since overlapping does not substantially occur.

Figure 13A:
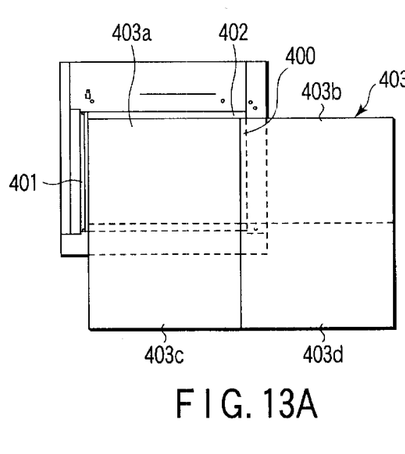
FIG. 13A is a view showing a state in which a ¼ area 403a of an original document 403 is scanned by a method according to the present invention.
Figure 13B:
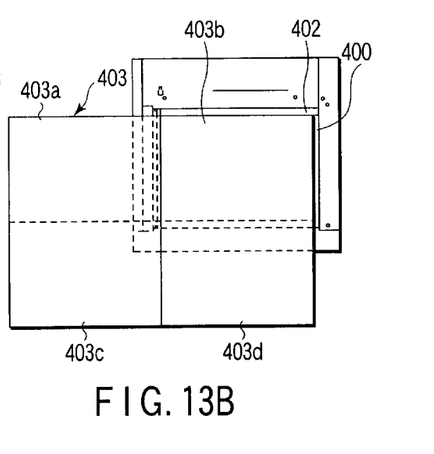
FIG. 13B is a view showing a state in which a ¼ area 403b of the original document 403 is scanned by the method according to the present invention.
Figure 13C:
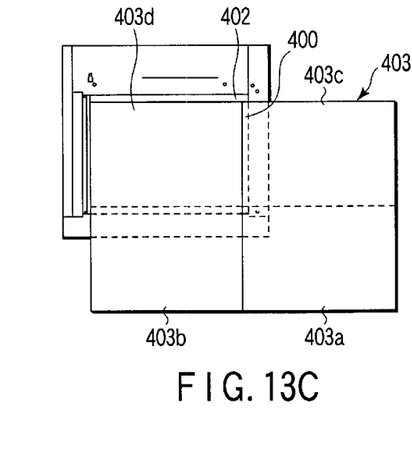
FIG. 13C is a view showing a state in which a ¼ area 403c of the original document 403 is scanned by the method according to the present invention.
Figure 13D:
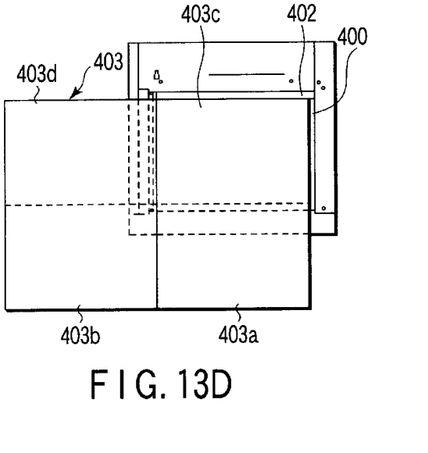
FIG. 13D is a view showing a state in which a ¼ area 403d of the original document 403 is scanned by the method according to the present invention.

The above explanation has been made of the case where the icon shown in FIG. 5B or 5D is selected. selected, scanning is carried out in the flow of FIGS. 13A to 13D. In this case, the procedure of setting ¼ areas 403c and 403d on the original document mount table 400 is different from FIGS. 11A to 11D. As shown in FIG. 13C, after the ¼ area 403d is set on the original document mount table 400 and predetermined processing is carried out, the ¼ area 403c is set on the original document mount table 400 and predetermined processing is carried out.

Figure 13E:
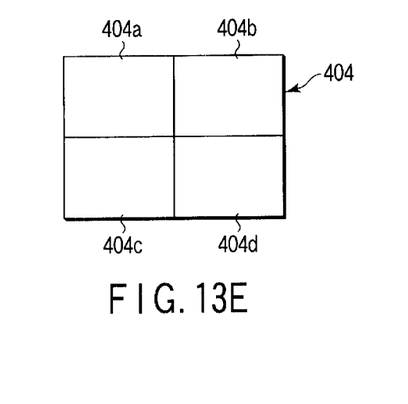
FIG. 13E is a view showing an example of print output.

The other parts of processing are the same as those shown in FIGS. 11A to 11D. In addition, as shown in FIG. 13E, the print output is the same as that shown in FIG. 11E.

As has been explained above, according to the present invention, it is possible to divide original documents of A1 and A2 sizes, rotate data, perform integration processing on data, and perform print-output for A3 size or smaller. Further, it is possible to obtain a print output edited in the 2-in-1 or 4-in-1 mode, without folding the original documents. The above processing can be realized easily and rapidly by a downsized structure at a low cost.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus which reads an image on an original document, with the image divided into plural areas, forms a copy image obtained by synthesizing images of the divided areas, and prints the copy image on a surface of a target image forming medium, comprising:

setting means for setting a predetermined mode;

reading means for reading the images of the divided areas of the original document;

storage means for storing image data obtained by the reading means; and image forming means for reading image data from the storage means, performs predetermined image processing thereon, and thereafter forms a copy image on the one surface of the target image forming medium.

2. The apparatus according to claim 1, wherein the setting means selects a desired one of plural icons concerning modes, each being as the predetermined mode, in which the original document divided into a plurality of areas is read and the obtained image data is subjected to minification processing to form a copy image on the one surface of the target image forming medium.

3. The apparatus according to claim 2, wherein each of the icons indicates an order in which an operator should set the divided plural areas of the original document on an original document mount table.

4. The apparatus according to claim 1, wherein the predetermined image processing includes processing of forming a copy image obtained by synthesizing the images of the divided areas, and of printing the copy image on the one surface of the target image forming medium.

5. The apparatus according to claim 1, further comprising original document pressing means which is attachable/detachable to an apparatus body.

6. An image forming apparatus which reads an image on an original document, with the image divided into plural areas, forms a copy image obtained by synthesizing images of the divided areas, and prints the copy image on a surface of a target image forming medium, comprising:

an operation panel which displays plural icons concerning predetermined modes, to allow an icon concerning a desired mode to be selected;

a scanner section which reads images of the divided areas of the original document;

a hard disk which stores image data read by the scanner section;

an image processing section which reads plural image data pieces from the hard disk and performs minification processing and synthesis processing thereon, to obtain one copy image;

a printer section which prints the one copy image on a surface of the target image forming medium; and each of the icons indicates an order in which an operator should set the divided plural areas of the original document on an original document mount table.

7. The apparatus according to claim 6, wherein the predetermined image processing includes processing of detecting a boundary portion when synthesizing plural image data pieces, and of eliminating overlapping and dislocation of the image data pieces.

8. An image forming method in which an image on an original document is read with the image divided into plural areas, a copy image is formed by synthesizing images of the divided areas, and the copy image is printed on a surface of a target image forming medium, comprising:

a step of setting a predetermined mode;

a step of reading the images of the divided areas of the original document;

a step of storing image data obtained by the reading means; and a step of reading image data from a storage means, performing predetermined image processing thereon, and thereafter forming a copy image on the one surface of the target image forming medium.

9. The method according to claim 8, wherein in the step of setting the predetermined mode, a desired one is selected from plural icons concerning modes, each being as the predetermined mode, in which the original document divided into a plurality of areas is read and the obtained image data is subjected to minification processing to form a copy image on the one surface of the target image forming medium.

10. The method according to claim 9, wherein each of the icons indicates an order in which an operator should set the divided plural areas of the original document on an original document mount table.

11. The apparatus according to claim 8, wherein the predetermined image processing includes processing of forming a copy image obtained by synthesizing the images of the divided areas, and of printing the copy image on the one surface of the target image forming medium.

12. An image forming method in which an image of an original document is read with the image divided into plural areas, a copy image is formed by synthesizing images of the divided areas, and the copy image is printed on a surface of a target image forming medium, comprising:

a step of displaying plural icons concerning predetermined modes, to allow an icon concerning a desired mode to be selected;

a step of reading images of the divided areas of the original document;

a step of storing image data read by the scanner section;

a step of reading plural stored image data pieces, and of performing minification processing and synthesis processing thereon, to obtain one copy image; and a step of printing the one copy image on a surface of the target image forming medium, wherein each of the icons indicates an order in which an operator should set the divided plural areas of the original document on an original document mount table.

13. The method according to claim 12, wherein the predetermined image processing includes processing of detecting a boundary portion when synthesizing plural image data pieces, and of eliminating overlapping and dislocation of the image data pieces.

* * * * *